May 29, 1956  A. H. HEINRICH  2,747,903
ROTARY SEAL
Filed Feb. 29, 1952  2 Sheets-Sheet 1

INVENTOR.
August H. Heinrich
BY Bates, Teare & McBean
Attorneys

May 29, 1956  A. H. HEINRICH  2,747,903
ROTARY SEAL

Filed Feb. 29, 1952  2 Sheets-Sheet 2

INVENTOR.
August H. Heinrich
BY Bates, Teared McBean
Attorneys

United States Patent Office 2,747,903
Patented May 29, 1956

2,747,903
ROTARY SEAL

August H. Heinrich, Euclid, Ohio, assignor to Metal Seal & Products, Inc., Euclid, Ohio, a corporation of Ohio Application February 29, 1952, Serial No. 274,155

7 Claims. (Cl. 286—11.15)

This invention relates to fluid seals generally and more particularly to improvements in fluid seals for a rotating shaft.

Rotating shafts which extend into fluid housings, particularly where the fluid is under pressure, require efficient shaft to housing seals to prevent leakage through the housing and along the shaft. Numerous structural difficulties are encountered in the development of such seals due to the motion of the shaft which causes wear and displacement of cooperating parts of the sealing assembly. No matter how efficient the sealing assembly may be in its initial use, the constant wear and displacement forces acting on the assembly seriously reduce the life and efficiency of the seal. According to this invention, there is provided an improved sealing assembly of relatively movable parts which automatically compensate against the wear and displacement forces acting thereon. Likewise, the sealing assembly is simple in its sealing function and inherently utilizes the principal sealing members as bearing surfaces for compensating members that are movable along the shaft.

Briefly, these objectives are accomplished by freely mounting an annular sealing disc on the shaft adjacent a rigid abutment which, in the preferred form, may be a fluid housing wall or the end closure of a cartridge-type enclosure for the sealing assembly. The shaft is also provided with a fixed partition in axial spaced relation from the sealing disc and another partition is carried by the shaft for axial movement between the fixed partition and the sealing disc. A resilient ring is concentrically disposed about the shaft intermediate the fixed and movable partitions and is supported between the partitions in radially expanded condition by means of an adjacent beveled face on at least one of the partitions. The retractive tendency of the ring urges the movable partition against the end sealing disc to maintain a fluid-tight seal between the abutment or end closure and the shaft and automatically compensates for wear on the radial bearing surfaces of the sealing disc.

There are also disclosed modifications of a double-acting high pressure rotary seal and of the inclusion of a cumulative seal between the movable partitions and the shaft or a supporting sleeve on the shaft. Another modification utilizes a retainer for the compensating ring at high speeds and guides for the movable partition to insure rotation of the partition and ring assembly with the shaft. Another embodiment adapts the principle, in modified form, to provide a rotary seal for a thrust bearing.

In the drawings, Fig. 1 illustrates in cross section one form of a double-acting rotary seal;

Figure 1:
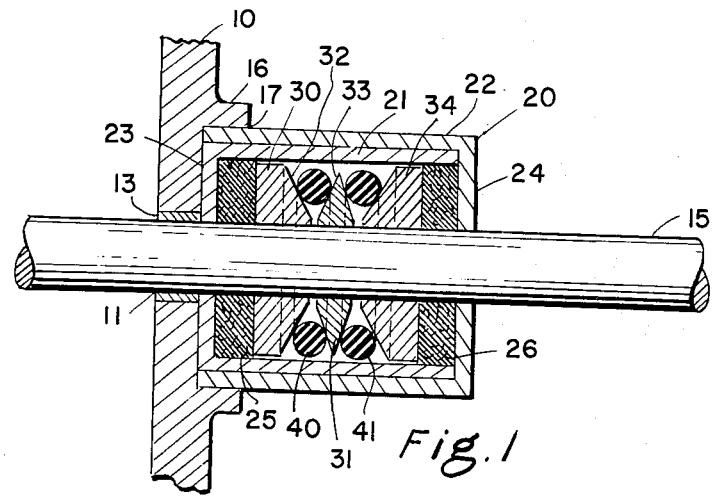

Referring now to Fig. 1 of the drawings, there is shown in cross section, a portion of a fluid housing 10 which has a bore 11 therethrough with a bearing surface 13 through which extends a rotating shaft 15. The shaft 15 may have an impeller on the end within the housing and a motor or other suitable driving means at the other end, neither of which form a part of this invention and are therefor not shown. In the preferred embodiment shown, the fluid housing wall 10 is provided with a boss 16 on its external face which has a cylindrical recess 17 in its external face to accommodate a sealing assembly cartridge enclosure indicated generally at 20. The enclosure 20 is preferably in the form of an assembly of telescoping hollow cylindrical members 21 and 22 each of which have a closure 23 and 24 respectively at one end. The assembly of telescoped members 21 and 22 is secured to the fluid housing 10 by insertion in the cylindrical recess 17 in the boss 16 on the housing wall 10. The enclosure 20 may be secured within the boss 16 by means of a press-fit or the outer telescopic member 22 may be threaded to engage a cooperating internal thread in the cylindrical recess 17 of the boss 16. In the preferred form illustrated, I have shown the enclosure 20 as secured within the boss 16 by means of a press-fit.

Each end closure 23 and 24 of the respective telescopic members 21 and 22 has an aligned opening for receiving the rotating shaft 15 therethrough. Thus, when the enclosure 20 is secured to the housing wall 10, it forms a closed space over a limited portion of the rotating shaft 15.

A sealing member in the form of an annular disc 25 is shown supported on the shaft 15 so as to abut an end closure. The sealing disc 25 has a radial dimension extending to the inner telescoping wall of the member 21. Sealing or packing rings for shafts may be made of many different materials such as leather, felt, asbestos, lead, wool, rubber, graphite or various fabricated mixtures of some of these materials and others depending upon the physical and functional qualities desired. In the preferred forms illustrated and described herein, the sealing discs are preferably made of carbon or graphite, or from a mixture of graphite and asbestos fabric in order to accomplish a satisfactory seal as well as to provide a bearing surface for relatively movable compensating members, as will be hereinafter more fully described.

In order to accomplish an efficient seal, the annular graphite sealing disc 25 must maintain a close contact with the adjacent end closure of the enclosure 20. This may be readily accomplished by exerting an axial pressure against the end seal. In accordance with this invention, such sealing pressure is exerted by means of an axially movable annular partition 30 which is made of rigid material such as metal or the like and which is loosely carried upon the shaft 15 for axial movement thereon. The annular partition 30 extends radially towards the inner wall of the enclosure 20 and terminate short thereof to provide a suitable clearance for relative movement therein. The movable partition 30 is also provided with a smooth face parallel with the adjacent bearing face of the graphite sealing disc 25 in order to effect a close running contact therewith.

Axial thrust is applied to the movable partition 30 by providing an integral or fixed annular partition 31 which is carried by the shaft 15 on the opposite side of the movable partition 30 from the adjacent sealing disc 25. The adjacent faces of the fixed partition 31 and the movable partition 30 are shown bevelled in opposite directions at 32 and 33 respectively to form a space therebetween which converges toward the shaft 15.

The V-shaped groove formed by the bevelled adjacent faces 32 and 33 of the partitions 30 and 31, forms a seat for a resilient ring 40 which is made of rubber or rubber-like material and which has an internal diameter that is less than the external diameter of either of the partitions 30 or 31 and may be substantially equal to the diameter of the rotating shaft 15. The cross-sectional dimension of the resilient ring 40 is sufficiently great to exceed the transverse dimension adjacent and parallel with the shaft 15 between the adjacent bevelled faces 32 and 33 of the partitions 30 and 31 so that the resilient ring 40 is supported in the groove between the partitions in radially expanded condition. The normal tractive force inherently acting to contract the ring 40 about the shaft 15 tends to urge the movable partition 30 in a direction towards and against the adjacent graphite sealing disc 25, thereby maintaining a sealing pressure against such disc. Since the coefficient of friction between the partition members 30 and 31 and the intermediate resilient ring 40 is greater than that existing between the sealing disc 25 and the movable partition 30, each of the partitions 30 and 31 and the ring 40 will be rotated with the shaft 15 relative to the sealing disc 25 which remains stationary within the enclosure 20. The axial thrust acting upon the movable partition 30 maintains an efficient sealing pressure and running contact between the adjacent bearing faces of the partition 30 and the sealing disc 25 regardless of length of use and wear or other displacement forces acting upon the sealing assembly within the enclosure. Thus, in addition to effecting a sealing pressure against the disc 25, the fixed and movable partitions 31 and 30 cooperating through the expanded ring 40 automatically act as a compensator for wear on the bearing surfaces to continuously maintain an effective fluid-tight seal within the cartridge enclosure 20 and along the shaft 15.

The hereinbefore described sealing assembly including the cartridge-type enclosure is particularly suitable for high fluid pressure sealing. However, it is possible to modify the rotary seal for low pressure sealing whereby the enclosure may be eliminated. Thus, in low pressure applications, only the sealing assembly comprising a sealing disc 25 and a fixed and movable partition for supporting a resilient traction ring in radially expanded condition therebetween could be applied to a rotating shaft and against a suitable rigid abutment, which abutment could be the housing wall of a low-pressure fluid housing.

Figure 5:
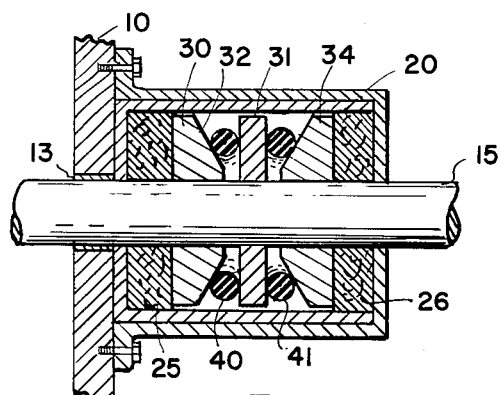
Fig. 5 illustrates in cross-section another embodiment of the rotary seal wherein only one face of a partition is bevelled to support each resilient ring.

In like manner, as shown in Fig. 5 of the drawings, the sealing assembly partitions can be modified with respect to their beveled faces so that only one face adjacent the ring of either the fixed or movable partitions is beveled to support the resilient ring in radially expanded condition between the corresponding movable and fixed partitions. I have found that effective compensation can be attained by beveling only one partition face at any angle from 5° to 30° with respect to the adjacent normal face of the cooperating partition. Such a seal has been effective at 5,000 lbs. per square inch of fluid pressure acting along a shaft rotating at 2,000 R. P. M.

In the preferred embodiment illustrated in Fig. 1 of the drawings, there is shown a double rotary seal having two annular sealing discs 25 and 26 abutting opposite end closures 23 and 24 within the enclosure 20 and two movable partitions 30 and 34 carried by the shaft 15 on opposite sides of the fixed partition 31, and each of the adjacent partition faces are provided with opposed bevelled surfaces for supporting a pair resilient rings 40 and 41 in radially expanded condition about the shaft 15, each of which act in opposite directions from the fixed partition 31 against the corresponding supporting movable partition 30 and 34 to urge such movable partitions against the corresponding end seals 25 and 26 within the cartridge enclosure 20. This arrangement provides a seal within each end of the enclosure 20 which effectively seals the fluid housing 10 from leakage through the enclosure and along the shaft.

Figure 2:
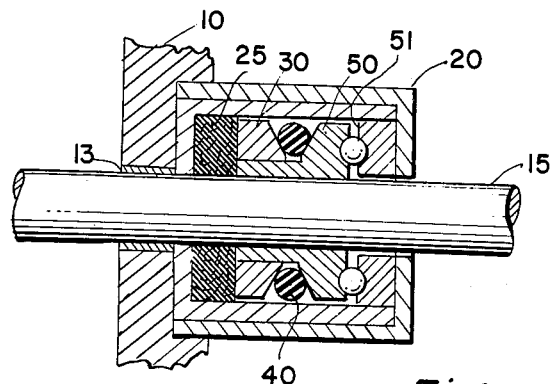
Fig. 2 illustrates a single acting rotary seal having a thrust bearing at one end.

Referring now to Fig. 2 of the drawings, there is shown another embodiment of the single rotary seal of this invention wherein the fixed partitions 31 is an integral part of a sleeve 50 fixed on the rotating shaft 15 which supports the movable partition 30 on its external periphery.

There is also provided a ball bearing arrangement within the end of the cartridge enclosure that has no sealing disc. The arrangement includes an annular bearing support 51 which has a grooved annular race-way concentrically encircling the shaft that is aligned with a corresponding race-way groove in the adjacent face of the end partition 31 on the sleeve 50. The ball bearings may be mounted within the race-way between the bearing surface 51 and the sleeve partition 31 to provide a suitable rotating bearing surface and to take up the end thrust of the assembly within the enclosing cartridge.

Figure 3:
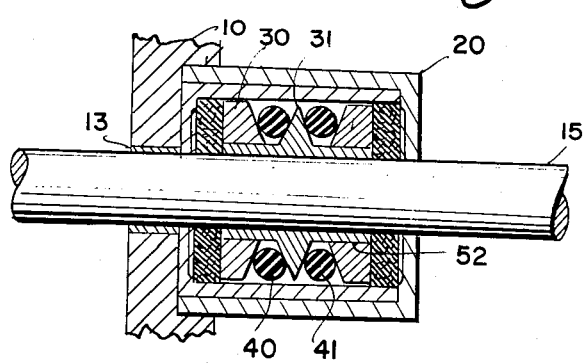
Fig. 3 illustrates in cross section another form of a double acting seal wherein the fixed partition is in the form of a sleeve on the shaft which supports the movable partitions.

In Fig. 3, there is shown another form of a double rotary seal utilizing the fixed-partition sleeve construction of the form shown in Fig. 2 of the drawings. The construction of the rotary seal in Fig. 3 is substantially the same as that shown in Fig. 1 except that the fixed partition memebr 31 is an integral part of a sleeve 52 which is fixed on the rotating shaft 15 and which extends along the shaft in either direction from the partition 31 into contact with the spaced sealing discs 25 and 26. In this form, the movable partitions 30 would have an internal bore greater than the rotating shaft 15 and sufficient to concentrically support them upon the extended ends of the sleeve 52 so that they may be axially shifted along the sleeve in the manner described.

Figure 4:
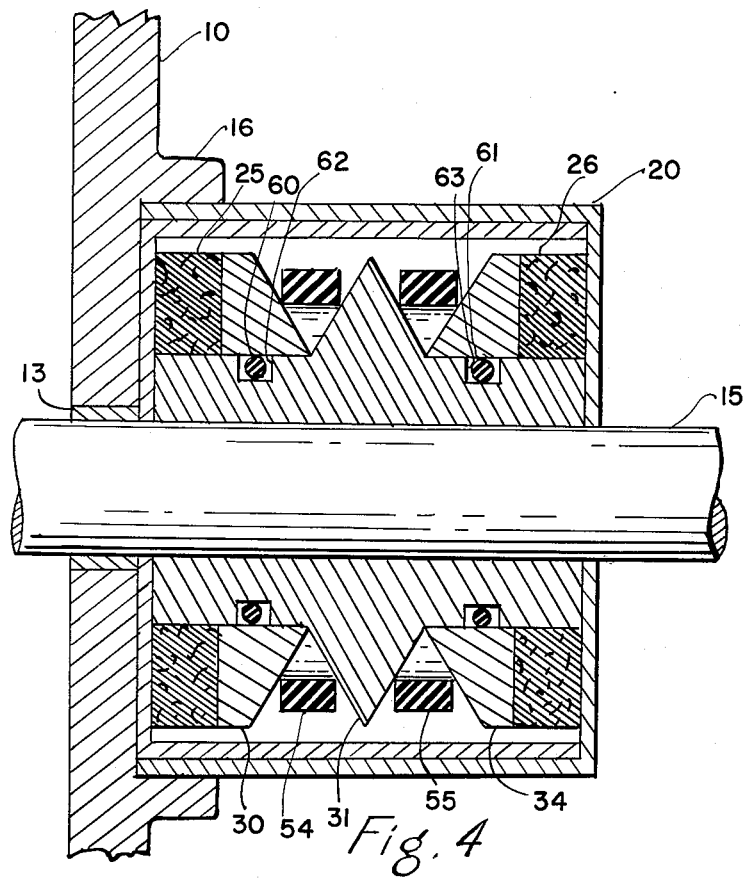
Fig. 4 illustrates in cross section, a modification of the double acting rotary seal of Fig. 3, wherein additional O-ring sealing means are provided on the sleeve.

It is not essential that the resilient rings 40 which exert the axial thrust against the movable partitions 30 and 34 to effect the sealing pressure be circular in cross section, and they may be made of any resilient material which has suitable properties relating to wear and resiliency to perform the functions described herein. Thus, in Fig. 4 of the drawings, there is shown resilient annular members 54 and 55 which have a rectangular cross section and which are made of a fabric composition having the desirable resilient or rubber-like characteristics. There is also shown in Fig. 4 a refinement wherein a cumulative seal is provided by inserting rubber-like O-sealing rings 60 and 61 in annular grooves 62 and 63 which are axially spaced on opposite sides of the fixed partition 31 in the external periphery of the sleeve 52. These resilient O-sealing rings have a greater cross sectional dimension than the depth of the corresponding annular grooves in which they are seated so that when the movable partitions 30 and 34 are mounted upon the corresponding ends of the sleeve 52, the adjacent internal annular surface of the partitions 30 and 34 respectively contact the corresponding O-sealing rings 60 and 61 and compress them sufficiently to distort their shape within the grooves to provide an additional fluid tight seal between the sleeve 52 and each of the movable partitions 30 and 34. Such cumulative sealing may be effected as desired depending upon the nature and extent of the seal desired.

The cartridge-type rotary seal herein illustrated and described is simple in construction and automatically compensates for wear on the bearing surface of the sealing discs. The high pressure sealing assembly within the cartridge enclosure is at all times in proper alignment with the rotating shaft and continuously maintains a fluid-tight seal between the fluid housing and the cartridge enclosure and rotating shaft regardless of normal wear and displacement during rotation of the shaft. The rotary seal may be constructed in various forms embodying a double or unitary seal within the cartridge enclosure and also may be refined to have additional cumulative sealing means depending upon the sealing requirements desired.

The cartridge enclosure is simply constructed from telescopic members which may be secured to the fluid housing by a press-fit. As a result, there is provided a rotary seal which is simple in construction and which may be readily assembled and mounted on a shaft and fluid housing for highly efficient performance.

The sealing and compensating principles described may be adapted in various modified forms to many different types of structural assemblies utilizing a rotating shaft and fluid pressure regardless of the amount or degree of pressure and speed.

I have shown and described what I consider to be the preferred embodiments of my invention along with similar modified forms and suggestions and, it will be obvious to those skilled in the art, that other changes and modifications may be made without departing from the scope of my invention as described and defined by the appended claims.

I claim:

1. A rotary seal for a shaft comprising, a pair of axially spaced rigid abutments freely surrounding the shaft, a pair of annular sealing members each carried by the shaft adjacent one of said abutments, a rigid partition fixedly carried by the shaft intermediate said annular sealing members, a pair of movable rigid partitions each movably supported on the shaft intermediate said fixed partition and a different one of said sealing members, a pair of resilient rings each concentrically disposed about the shaft intermediate said fixed partition and a different one of said movable partitions, and means in the form of an adjacent beveled face on a corresponding partition for supporting each of said rings in radially expanded condition between the fixed partition and each of said movable partitions to axially urge the respective movable partitions against the adjacent end seals and maintain a fluid tight seal between the shaft and the corresponding abutments.

2. The rotary seal of claim 1, wherein the rigid partition extends from a sleeve which is fixedly carried by the shaft and wherein the pair of movable rigid partitions are axially movable upon the sleeve.

3. The rotary seal of claim 1, wherein the rigid partition is fixedly carried by a sleeve which is fixed to the shaft and wherein the sleeve has an external annular groove underlying each movable partition and wherein a resilient sealing ring is carried within each groove to form a cumulative sealing contact with the surmounting surface of the associated movable partition.

4. The rotary seal of claim 1, wherein each resilient ring has an internal diameter less than the external diameter of each partition.

5. A rotary seal for a shaft comprising, an enclosure carried by the shaft and having end closures forming a closed space about the shaft, a pair of annular sealing members carried in spaced relation on the shaft within the enclosure and each forming a seal abutting one end closure therein respectively, a pair of rigid annular partitions each loosely carried for axial movement along the shaft adjacent an end seal within the enclosure, said shaft having a fixed partition intermediate each of said movable partitions within the enclosure, said fixed partition having opposed bevelled faces, each of said pair of partitions having a bevelled face adjacent the fixed partition and forming an outwardly divergent space with the adjacent bevelled face of the fixed partition, a pair of resilient rings each disposed in radially expanded condition about the shaft within a corresponding space between the fixed partition and one of the movable partitions to urge its respectively supporting movable partition axially along the shaft against the corresponding end seal and effect a fluid-tight seal within each end of the enclosure and along the shaft.

6. A rotary seal for a shaft and fluid housing comprising, an enclosure carried by the fluid housing on the shaft and having end closures forming a closed space about the shaft, said shaft supporting a fixed partition and two axially movable partitions in spaced relation from each other on opposite sides of the fixed partition within the enclosure, an annular sealing member carried by the shaft intermediate each movable partition and the adjacent end closure therein, a pair of resilient rings each having an internal diameter less than the external diameter of each of said partitions and each having a cross-section greater than the corresponding axial dimension between the fixed partition and each movable partition at the shaft, and means in the form of opposed bevelled adjacent faces on each partition for supporting a ring in radially expanded condition about the shaft between the fixed partition and each movable partition respectively to axially urge the corresponding supporting movable partition against the adjacent end seal and form a fluid-tight seal within each end of the enclosure and along the shaft.

7. The rotary seal of claim 6, wherein the fixed partition is mounted upon a sleeve which is fixedly secured to the shaft and wherein the two axially movable partitions are mounted upon the sleeve.

References Cited in the file of this patent

UNITED STATES PATENTS

| 849,576 | Schulz | Apr. 9, 1907 |
| 1,861,275 | Hopkins | May 31, 1932 |
| 2,231,690 | Sheldrick | Feb. 11, 1941 |
| 2,393,779 | Hunter | Jan. 29, 1946 |
| 2,422,007 | Gilbert | June 10, 1947 |

FOREIGN PATENTS

| 379,210 | Great Britain | Aug. 25, 1932 |
| 414,835 | Great Britain | of 1934 |